United States Patent
Yoshino

(10) Patent No.: US 7,916,383 B2
(45) Date of Patent: Mar. 29, 2011

(54) WAVELENGTH CONVERSION DEVICE

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/855,770

(22) Filed: Aug. 13, 2010

(65) Prior Publication Data

US 2010/0321764 A1    Dec. 23, 2010

Related U.S. Application Data

(63) Continuation of application No. PCT/JP2009/052121, filed on Feb. 3, 2009.

(30) Foreign Application Priority Data

Feb. 27, 2008 (JP) ................... 2008-045901

(51) Int. Cl.
  *G02F 1/355* (2006.01)
  *G02F 1/35* (2006.01)
  *G02F 2/02* (2006.01)

(52) U.S. Cl. ........... 359/326; 359/328; 359/332; 372/22

(58) Field of Classification Search .......... 359/326–332; 385/122; 372/21–22
  See application file for complete search history.

(56) References Cited

U.S. PATENT DOCUMENTS

| 6,353,495 | B1 * | 3/2002 | Mizuuchi et al. ............. 359/326 |
| 6,631,231 | B2 * | 10/2003 | Mizuuchi et al. ............. 385/122 |
| 7,164,525 | B2 * | 1/2007 | Noda et al. .................... 359/326 |
| 2006/0120415 | A1 | 6/2006 | Iwai et al. |
| 2007/0223081 | A1 | 9/2007 | Yoshino et al. |

FOREIGN PATENT DOCUMENTS

| JP | 2003-107545 | 4/2003 |
| JP | 2005-55528 | 3/2005 |
| JP | 2007-241078 | 9/2007 |

OTHER PUBLICATIONS

U.S. Appl. No. 12/395,908, filed Mar. 2, 2009, Takashi Yoshino.

* cited by examiner

*Primary Examiner* — Daniel Petkovsek
(74) *Attorney, Agent, or Firm* — Burr & Brown

(57) ABSTRACT

A wavelength conversion device includes a supporting body, a wavelength conversion substrate of a Z-plate of a ferroelectric single crystal with a periodic domain inversion structure formed therein and having a thickness "T" of 10 μm or more and 100 μm or less, a buffer layer provided on a bottom face of the wavelength conversion substrate, and an organic resin adhesive layer adhering the supporting body and buffer layer with a thickness of 0.6 μm or more and 2.0 μm or less.

1 Claim, 3 Drawing Sheets

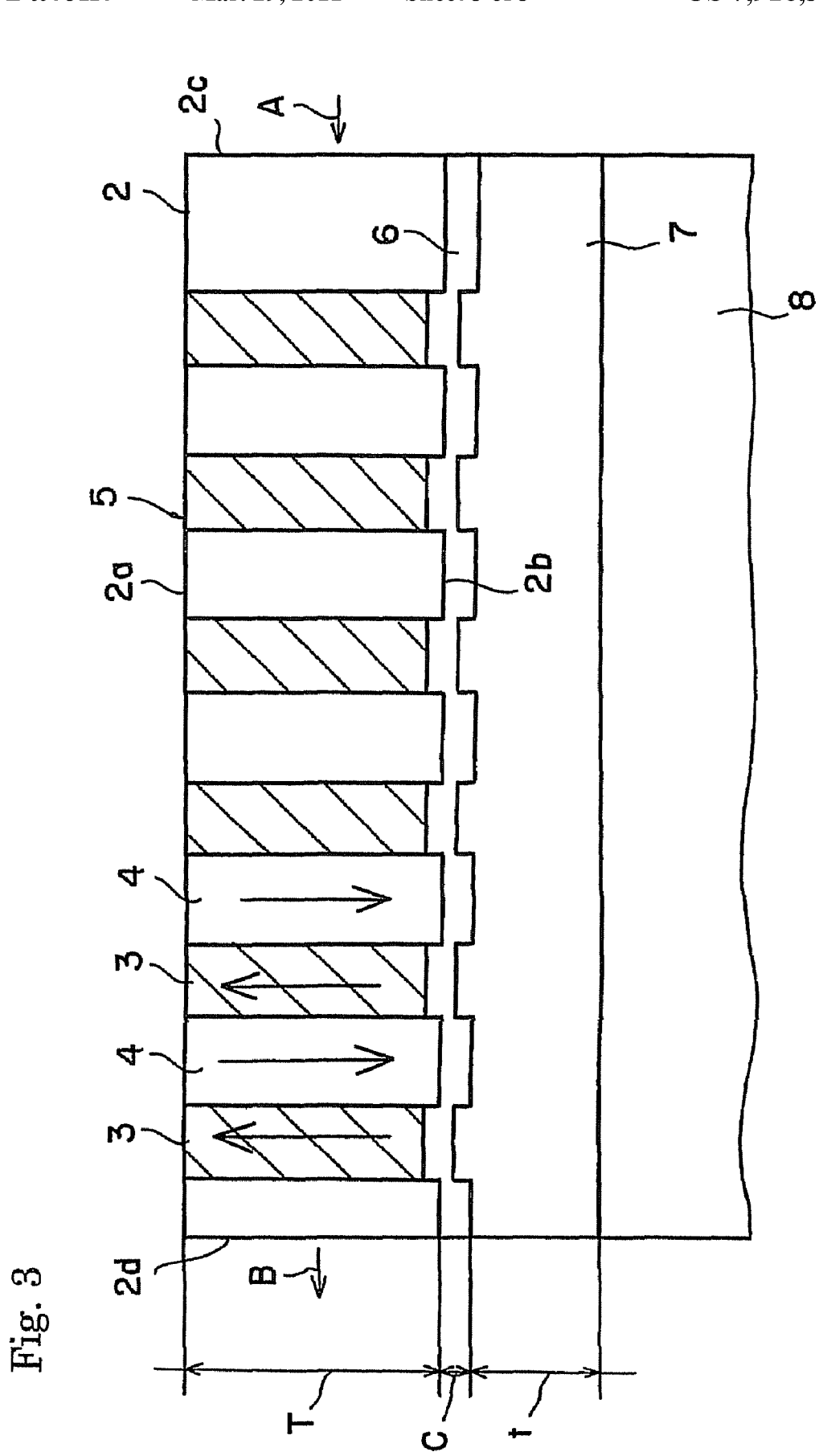

WAVELENGTH CONVERSION DEVICE

FIELD OF THE INVENTION

The present invention relates to a wavelength conversion device.

BACKGROUND OF THE INVENTION

Non-linear optical crystals, such as lithium niobate and lithium tantalate single crystals, have high secondary non-linear optical constants. A periodic polarization inversion configuration can be formed in the crystal to produce a Quasi-Phase-Matched (QPM) Secondary-Harmonic-Generation (SHG) device. Further, an optical waveguide may be formed in the periodic polarization inversion configuration to produce a high efficient SHG device, leading to a wide variety of applications in optical communication, medical, photochemical and various optical measurement fields.

According to Japanese patent publication No. 2005-55528A filed by the assignee, a semiconductor laser oscillating device of Fabri-Perro type is used to oscillate light, which is then irradiated into a slab-type optical waveguide made of a non-linear optical crystal as fundamental wave to output blue-ray laser from the slab optical waveguide. The slab-type optical waveguide is produced by polishing a Z-plate of the non-linear optical crystal such as lithium potassium niobate.

SUMMARY OF THE INVENTION

The present inventor has tried to input fundamental wave irradiated from a solid semiconductor laser light source into a slab optical waveguide to generate second harmonic wave. In the trial, the slab optical waveguide is composed of a Z-plate of lithium niobate single crystal doped with magnesium oxide and a periodic domain inversion structure is formed in the slab optical waveguide. The Z-plate is adhered onto a separate thicker supporting body with a resin adhesive.

As the present inventor produced such wavelength conversion device to oscillate a second harmonic wave, however, the following unexpected phenomenon was observed. That is, the deviation of an output of the second harmonic wave was proved to be large beyond expectation so that the output of the second harmonic wave was considerably lowered in some devices. Further, when a device is produced and subjected to alignment of optical axis with respect to an outer optical fiber, laser beam is made incident into the device to measure its optical amount. At this stage, a resin adhesive layer was burnt near an end face of the device to induce the failure of adhesion near the end face.

An object of the present invention is to provide a wavelength conversion device by forming a periodic domain inversion structure in a slab type optical waveguide and by adhering the slab type optical waveguide onto a supporting body, so that the reduction and fluctuation of an output of the wavelength converted light and the failure of the end face due to the burn-out of the adhesive layer can be prevented and a large output can be stably obtained.

The present invention provides a wavelength conversion device comprising:
a supporting body;
a wavelength conversion substrate comprising a Z-plate of a ferroelectric single crystal and a periodic domain inversion structure formed therein, the substrate having a thickness of 10 µm or more and 100 µm or less;
a buffer layer provided on a bottom face of the wavelength conversion substrate; and
an organic resin adhesive layer adhering the supporting body and the buffer layer and having a thickness of 0.6 µm or more and 2.0 µm or less.

The present inventor has studied the cause of the reduction of output power of the wavelength converted light and the burning of the adhesive layer as described above. It was thereby found that the reduction of the output power of the converted light and the burning of the adhesive layer were caused due to the interaction of the periodic domain inversion structure, buffer layer and resin adhesive layer, depending on the thickness of the resin adhesive layer.

Based on the discovery, the present inventor found that a high output power of the converted light can be stably maintained and the failure at the end part due to the burning of the resin adhesive can be prevented by making the film thickness of the adhesive layer, under the periodic domain inversion structure and buffer layer, to 0.6 µm or more and 2.0 µm or less. The present invention was thus made.

BRIEF DESCRIPTION OF THE DRAWINGS

FIG. 3 is a diagram schematically showing a wavelength conversion device according to a comparative example.

DETAILED DESCRIPTION OF THE INVENTION

The advantageous effects of the present invention will be described in more detail, referring to the attached drawings.

Figure 1:
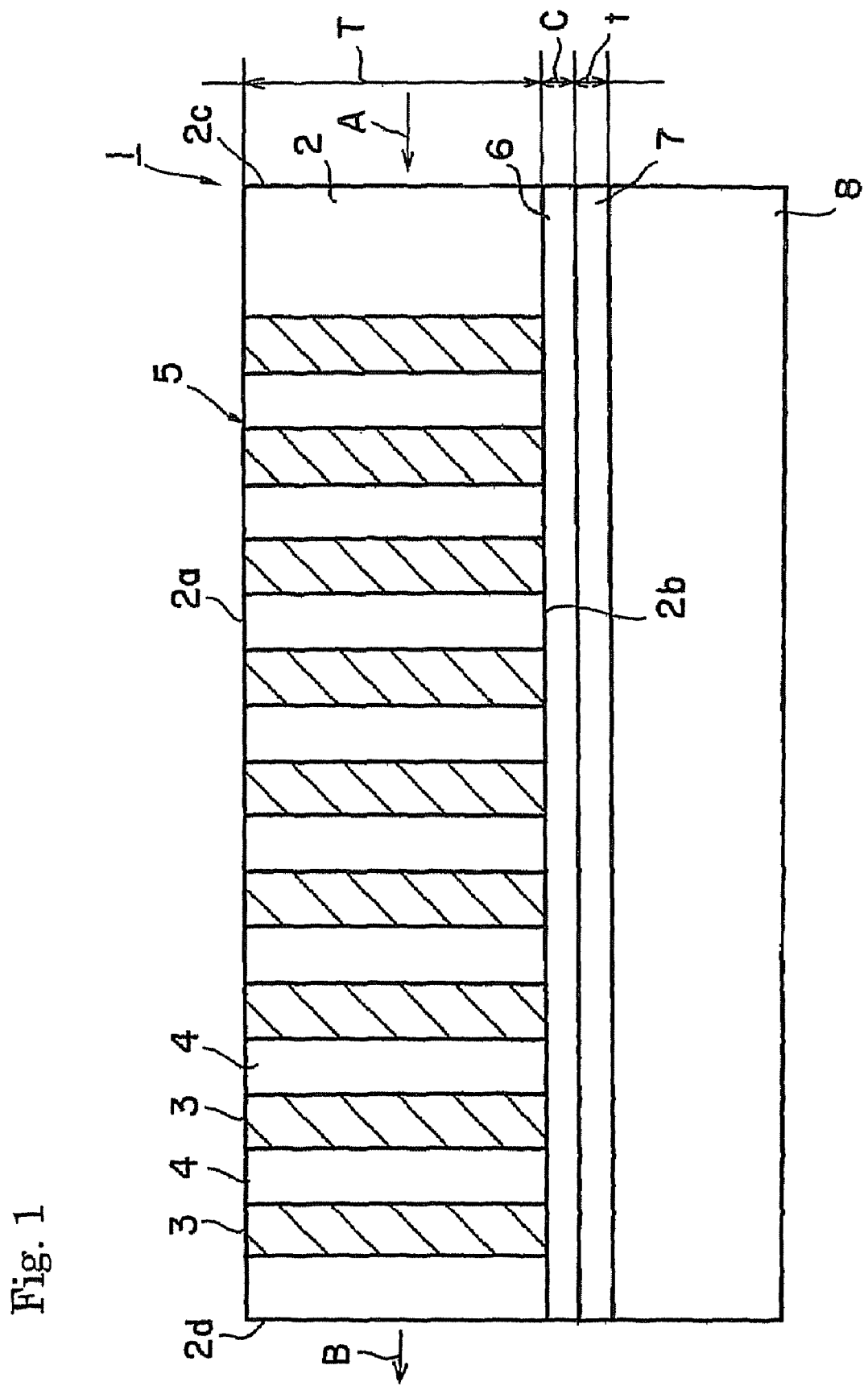
FIG. 1 is a diagram schematically showing a wavelength conversion device 1 according to an embodiment of the present invention.

FIG. 1 is a diagram schematically showing a wavelength conversion device 1 according to the present invention.

According to the embodiment, domain inversion parts 3 are formed in a Z-plate 2 made of a ferroelectric single crystal at a predetermined interval so that the inversion parts 3 extend from an upper face 2a to a lower face 2b. The Z-plate means a substrate whose direction of domain inversion extends between an upper face and a lower face of the plate. Non-domain inversion parts 4 are left between the adjacent domain inversion parts 3, respectively. Many domain inversion parts 3 and non-inversion parts 4 are alternately formed at a predetermined interval to form a periodic domain inversion structure 5. A buffer layer 6 is formed on a bottom face 2b of the wavelength conversion substrate 2. According to the present embodiment, a supporting body 8 is adhered to the buffer layer 6 through an organic resin adhesive layer 7.

Besides, an additional buffer layer may be formed on the side of an upper face 2a of the substrate 2 and a separate supporting body may be adhered onto the buffer layer, although such configuration is not shown in FIG. 1.

A fundamental wave is made incident into an incident face 2c from a light source not shown as an arrow A and then subjected to wavelength conversion through the periodic domain inversion structure 5, so that the wavelength converted light is emitted from an emitting face 2d as an arrow B. The wavelength of the converted light is decided by a period of the domain inversion in a direction of the propagating light.

According to the present invention, the supporting body and buffer layer are adhered with the organic resin adhesive and the thickness "t" of the organic resin adhesive layer is limited to 0.6 µm or more and 2.0 µm or less. The reasons for the limitations and the advantageous effects are described below.

Figure 2:
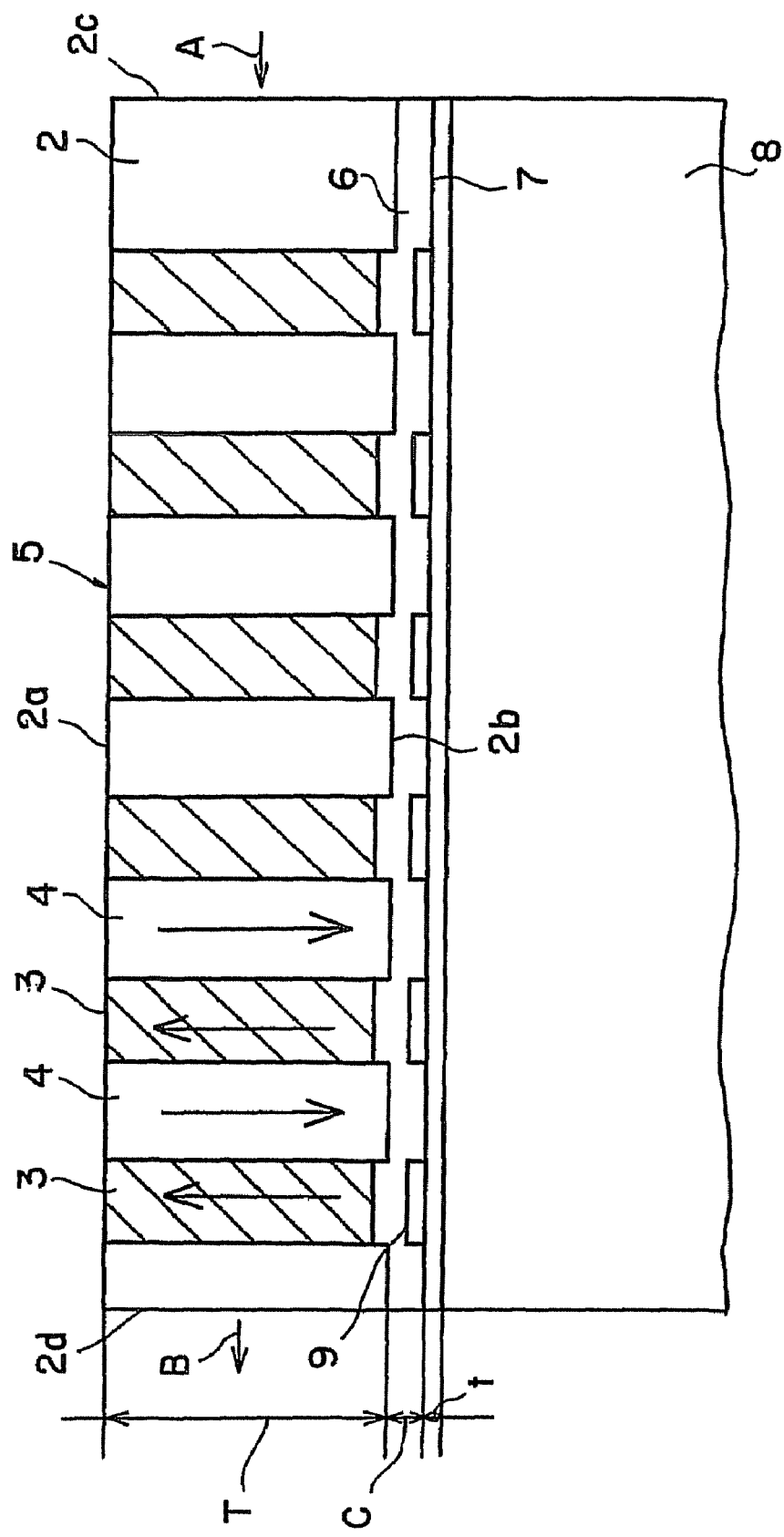
FIG. 2 is a diagram schematically showing a wavelength conversion device according to a comparative example.

The present inventor had variously studied the reasons of the increase of loss of the converted light after passing through the periodic domain inversion structure, and reached the following discovery. This will be described referring to FIG. 2.

First, in the case that a periodic domain inversion structure is formed in a Z-plate of a ferroelectric single crystal, the domain inversion parts 3 tend to slightly retreat with respect to the non domain inversion parts 4 at the bottom face of the plate. As a result, micro irregularities were formed on the bottom face of the substrate. When the buffer layer 6 is provided on the bottom face, the micro irregularities on the bottom face of the wavelength conversion substrate 2 are transferred onto the surface of the buffer layer 6.

In the case that the organic adhesive layer 7 is thin, particularly when the thickness is below 0.6 µm, it is difficult that micro hollows on the surface of the buffer layer 6 are filled with the resin adhesive, so that micro bubbles 9 tend to be formed. The propagating light in the periodic domain inversion structure 5 is influenced by many bubbles 9 and then scattered to the outside to result in an optical loss. It is proved that the optical loss causes the reduction of output power of the wavelength converted light.

The present inventor found that the micro irregularities on the surface of the buffer layer can be filled and the bubbles 9 can be prevented so that the output power of the wavelength converted light can be improved and stabilized, by making the thickness "t" of the organic adhesive layer 7 to 0.6 µm or more.

On the other hand, as shown in FIG. 3, when the organic resin adhesive layer 7 is thick, particularly when the thickness "t" exceeds 2.0 µm, the irregularities on the surface of the buffer layer 6 and the resulting bubbles can be prevented. Unexpectedly, however, it was found that the wavelength converted light after the conversion in the periodic domain inversion structure 5 is absorbed into the organic resin adhesive layer 7, so that the resin layer 7 is heated and burned at the end part. Such heating and burning are not observed in the case of the fundamental wave and unique phenomenon in the wavelength converted light generated by the periodic domain inversion structure.

Further, in the case that the wavelength conversion substrate 2 made of a ferroelectric single crystal is an X-plate, Y-plate, an offset X-plate or the like instead of the Z-plate, the periodic domain inversion structure is not exposed at the bottom face 2b of the wavelength conversion substrate 2 and the resulting irregularities are not generated. Therefore, the above described burning of the resin adhesive layer due to the surface irregularities of the buffer layer 6 and the reduction of the output power of the wavelength converted light due to the loss of light do not occur.

Further, in the case that the wavelength conversion part is not composed of a periodic wavelength conversion structure, the periodic wavelength conversion structure is not exposed at the bottom face 2b of the wavelength conversion substrate 2, so that the resulting irregularities are not generated. Therefore, the above described burning of the resin adhesive layer due to the surface irregularities of the buffer layer 6 and the reduction of the output power of the wavelength converted light due to the loss of light do not occur. That is, the present invention is based on the discovery of the problems characteristic to the above described specific structure, and thus has an inventive step.

According to the present invention, the thickness "T" of the wavelength conversion substrate 2 is made 10 µm or more and 100 µm or less. By making the thickness 10 µm or more, it becomes easy to irradiate the fundamental wave into the waveguide to improve the connection efficiency of the fundamental wave. On the viewpoint, the thickness of the wavelength conversion substrate 2 may preferably be 20 µm or more.

Further, the thickness "T" of the wavelength conversion substrate 2 is made 100 µm or less, so that the energy efficiency of the guided light and the conversion efficiency can be improved. On the viewpoint, the thickness of the wavelength conversion substrate 2 may preferably be 80 µm or less.

The ferroelectric single crystal forming the wavelength conversion substrate is not particularly limited, as long as it is capable of modulating light. The single crystal may be lithium niobate, lithium tantalate, lithium niobate-lithium tantalate solid solution, lithium potassium niobate, KTP, GaAs, quartz and the like.

In order to further enhance the optical damage resistance of the optical waveguide, the ferroelectric single crystal may contain one or more metallic elements selected from the group consisting of magnesium (Mg), zinc (Zn), scandium (Sc) and indium (In), and magnesium is especially preferable. Further a rare earth element may be contained as a dopant into the ferroelectric single crystal. The rare earth element functions as an additive element for laser oscillation. As the rare earth element, Nd, Er, Tm, Ho, Dy and Pr are especially preferable.

As the materials for the buffer layer 6, silicon oxide, magnesium fluoride, silicon nitride, aluminum oxide and tantalum pentoxide may be listed as an example.

The thickness "c" of the buffer layer 6 is not particularly limited. If the thickness "c" of the buffer layer is too small, however, the optical propagation loss is increased. On the viewpoint, "c" may preferably 0.2 µm or larger. Further, if the thickness "c" of the buffer layer is too large, the formation of the buffer layer would become difficult. On the viewpoint, "c" may preferably be 2.0 µm or less and more preferably 1.5 µm or less.

Although the organic resin adhesive forming the organic resin adhesive layer is not particularly limited, and includes an ultraviolet curable adhesive and a thermosetting adhesive. Specific examples of the organic resin adhesive are not particularly limited, and include an acrylic resin adhesive, a thermosetting resin adhesive and an ultraviolet curable resin adhesive.

EXAMPLES

Example 1

The optical conversion device having the structure shown in FIG. 1 was produced.

Specifically, a comb-shaped periodic electrode having a period of 7.0 µm was formed on a 5% MgO-doped lithium niobate Z-plate having a thickness of 0.5 mm. An electrode was formed on the whole of the back face of the substrate, and a pulse voltage was applied thereon. The surface was etched with mixture of hydrofluoric acid and nitric acid to prove that a periodic domain inversion structure 5 was formed. After the periodic domain inversion structure 5 was formed, an $SiO_2$ buffer layer 6 having a thickness of 0.4 µm was formed thereon by sputtering.

An acrylic resin adhesive was applied on a non-doped lithium niobate substrate having a thickness of 0.5 mm, which was then adhered to the above described MgO-doped lithium niobate substrate. The thickness "t" of the adhesive layer at this stage was 0.6 µm. The surface of the MgO doped lithium niobate substrate was subjected to grinding and polishing to a thickness of 50 µm. After an optical waveguide was formed, an over clad of $Ta_2O_5$ with a thickness of 0.5 µm was formed by sputtering. After the thus obtained device was cut with a dicer to a length of 5 mm and a width of 8.0 mm, the end face was polished and coated with an anti-reflection film.

Nd-YAG laser was used in the optical waveguide to measure the optical characteristics. That is, the oscillation power of the laser was adjusted at 5 W to provide a fundamental light, which was condensed with a lens onto the end face of the waveguide. It was thus proved that 96 percent of the fundamental wave could be connected and an SHG output power of 100 mW was observed.

Example 2

The wavelength conversion device was produced according to the same procedure as the Example 1, except that the thickness "t" of the adhesive layer 7 was 2.0 µm. An oscillation power from the Nd-YAG laser was adjusted at 5 W, and the fundamental wave was condensed at the end face of the waveguide. It was thus proved that 95 percent of the fundamental wave could be connected to the waveguide to obtain an SHG output of 93 mW.

Comparative Example 1

An adhesive was applied on a non-doped lithium niobate substrate having a thickness of 0.5 mm, which was then adhered to the above described MgO-doped lithium niobate substrate. At this stage, the thickness of the adhesive layer was 0.3 µm. The surface of the MgO doped lithium niobate substrate was subjected to grinding and polishing to a thickness of 50 µm.

After the optical waveguide was formed, an over clad of $Ta_2O_5$ with a thickness of 0.5 µm was formed by sputtering. After the thus obtained device was cut with a dicer to a length of 5 mm and a width of 8.0 mm, the end face was polished. At this stage, bubbles 9 were exposed at the end face part, so that a part of the slab waveguide was peeled.

Nd-YAG laser was used in the optical waveguide to measure the optical characteristics. The oscillation power of the laser was adjusted at 2 W to provide a fundamental light, which was condensed with a lens onto the end face of the waveguide. It was thus proved that 65 percent of the fundamental wave could be connected and an SHG output power of 58 mW was observed.

Comparative Example 2

The thickness "t" of the adhesive layer was made 0.5 µm in the Comparative example 1. After the thus obtained device was cut with a dicer to a length of 5 mm and a width of 8.0 mm, the end face was polished. At this stage, bubbles 9 were exposed at the end face part, so that a part of the slab waveguide was peeled.

Nd-YAG laser was used in the optical waveguide to measure the optical characteristics. The oscillation power of the laser was adjusted at 2 W to provide a fundamental light, which was condensed with a lens onto the end face of the waveguide. It was thus proved that 70 percent of the fundamental wave could be connected and an SHG output power of 65 mW was observed.

Comparative Example 3

The thickness "t" of the adhesive layer was made 3.0 µm in the Comparative example 1. Nd-YAG laser was used in the waveguide to measure the optical characteristics. The oscillation power of the laser was adjusted at 5 W to provide a fundamental light, which was condensed with a lens onto the end face of the waveguide. It was thus proved that 95 percent of the fundamental wave could be connected and an SHG output power of 98 mW was observed. After that, however, the adhesive layer was burned and failed near the end face.

Comparative Example 4

The thickness "t" of the adhesive layer was made 2.2 µm in the Comparative example 1. Nd-YAG laser was used in the waveguide to measure the optical characteristics. The oscillation power of the laser was adjusted at 5 W to provide a fundamental light, which was condensed with a lens onto the end face of the waveguide. It was thus proved that 96 percent of the fundamental wave could be connected and an SHG output power of 99 mW was observed. However, a part of the adhesive layer was burned near the end face, so that the SHG output power was lowered to 40 mW.

Next, the wavelength conversion devices were produced according to the same procedure as the Example 1. The devices were subjected to the measurement of SHG output power as the Example 1 and of appearance of the device. However, the thicknesses of the wavelength conversion device and supporting body were changed as shown in Table 1. The SHG output power and the observed phenomenon were shown in Table 1.

TABLE 1

| Thickness of Wavelength conversion substrate (µm) | Thickness Of Adhesive Layer (µm) | Phenomenon |
| --- | --- | --- |
| 9 | 0.6 | Connection efficiency was lowered. |
| 9 | 2.1 | A part of adhesive layer near end face was burned and failed. |
| 10 | 0.5 | Bubbles were exposed at end face |
| 10 | 0.6 | No problem |
| 10 | 2.0 | No problem |
| 10 | 2.1 | A part of adhesive layer near end face was burned and failed. |
| 40 | 1.3 | No problem |
| 100 | 0.5 | Bubbles were exposed at end face. |
| 100 | 0.6 | No problem |
| 100 | 2.0 | No problem |
| 100 | 2.1 | A part of adhesive layer near end face was burned and failed. |
| 101 | 0.6 | Conversion efficiency was lowered. |
| 101 | 2.0 | Conversion efficiency was lowered. |

When the thickness of the wavelength conversion substrate was less than 10 µm, the connection efficiency was lowered. Further, when the thickness of the adhesive layer was 0.5 µm, bubbles were exposed at the end face, so that the SHG output power was lowered. Further, when the thickness of the adhesive layer was 2.1 µm, a part of the adhesive layer near the end face was burned and failed.

Although the specific embodiments of the present invention has been described above, the invention is not limited to the specific embodiments, and may be performed with various changes and modifications without departing from the attached claims.

The invention claimed is:
1. A wavelength conversion device comprising:
   a supporting body;
   a wavelength conversion substrate comprising a Z-plate of a ferroelectric single crystal and a periodic domain inversion structure formed therein, the substrate having a thickness of 10 µm or more and 100 µm or less;
   a buffer layer provided on a bottom face of said wavelength conversion substrate; and
   an organic resin adhesive layer adhering said supporting body and said buffer layer and having a thickness of 0.6 µm or more and 2.0 µm or less.

* * * * *